US008601113B2

(12) United States Patent  
Dolisy (10) Patent No.: US 8,601,113 B2
(45) Date of Patent: Dec. 3, 2013

(54) METHOD FOR SUMMARIZING FLOW INFORMATION FROM NETWORK DEVICES

(75) Inventor: Joel Dolisy, Austin, TX (US)

(73) Assignee: Solarwinds Worldwide, LLC, Austin, TX (US)

( * ) Notice: Subject to any disclaimer, the term of this patent is extended or adjusted under 35 U.S.C. 154(b) by 731 days.

(21) Appl. No.: 11/987,562

(22) Filed: Nov. 30, 2007

(65) Prior Publication Data

US 2009/0144414 A1 Jun. 4, 2009

(51) Int. Cl.
G06F 15/16 (2006.01)

(52) U.S. Cl.
USPC .......................................... 709/224; 709/202

(58) Field of Classification Search
USPC ....................................................... 709/224
See application file for complete search history.

(56) References Cited

U.S. PATENT DOCUMENTS

| | | | |
|---|---|---|---|
| 6,405,251 B1 | 6/2002 | Bullard et al. | |
| 6,625,657 B1 | 9/2003 | Bullard | |
| 6,751,663 B1 | 6/2004 | Farrell et al. | |
| 7,167,860 B1 | 1/2007 | Black et al. | |
| 7,243,143 B1 | 7/2007 | Bullard | |
| 7,385,924 B1 | 6/2008 | Riddle | |
| 7,508,764 B2 | 3/2009 | Back et al. | |
| 7,587,513 B1* | 9/2009 | Maturi et al. | 709/234 |
| 7,660,892 B2 | 2/2010 | Choong et al. | |
| 2001/0021176 A1 | 9/2001 | Mimura et al. | |
| 2002/0019875 A1 | 2/2002 | Garrett et al. | |
| 2004/0030927 A1 | 2/2004 | Zuk | |
| 2004/0267945 A1 | 12/2004 | Reiss | |
| 2005/0039104 A1 | 2/2005 | Shah et al. | |
| 2005/0286423 A1* | 12/2005 | Poletto et al. | 370/235 |
| 2006/0089985 A1 | 4/2006 | Poletto | |
| 2006/0168168 A1 | 7/2006 | Xia et al. | |
| 2007/0150497 A1 | 6/2007 | De La Cruz et al. | |
| 2007/0201359 A1 | 8/2007 | Matsubara et al. | |
| 2008/0291915 A1 | 11/2008 | Foschiano | |

OTHER PUBLICATIONS

Non-Final Office Action, dated May 13, 2010, in U.S. Appl. No. 11/987,560, by Ex. Ho.
Non-Final Office Action, dated Jun. 11, 2010, in U.S. Appl. No. 11/987,561 by Ex. Bhatia.
Non-Final Office Action dated Nov. 1, 2010, in U.S. Appl. No. 11/987,561 by Ex. Bhatia.
Non-Final Office Action dated Oct. 27, 2010, in U.S. Appl. No. 11/987,560 by Ex. Ho.
Final Office Action, dated Sep. 29, 20111, in U.S. Appl. No. 11/987,560 by Ex. Chuong Ho.
Notice of Allowance, dated Jan. 19, 2011; Issued in corresponding U.S. Appl. No. 11/987,560 by Ex. Chuong Ho.

* cited by examiner

Primary Examiner — David Lazaro
(74) Attorney, Agent, or Firm — Squire Sanders (US) LLP (57) ABSTRACT

A method for aggregating network flow information within a relational database relates to by maximizing concurrency between insertion and analysis of database records. In particular, data is generally stored according to the network devices associated with the flow records. Then, the flow records for the separate devices may be aggregated at certain time intervals and separately organized. In this way, contention is decreased as analysis can occur on the aggregated flow records, while new flow records are stored. In another embodiment, the aggregated data can be reaggregated again at a second, larger time interval.

17 Claims, 6 Drawing Sheets

Figure 1

| | |
|---|---|
| Exemplary Flow Record | 200 |
| Flow Version number | 210 |
| Sequence number | 220 |
| Input and output interface SNMP indices | 230 |
| Timestamps for the flow start and finish time | 240 |
| Number of bytes and packets observed in the flow | 250 |
| Layer 3 headers, including Source & destination IP addresses, Source and destination port numbers, IP protocol, and Type of Service (ToS) value | 260 |
| For TCP flows, the union of all TCP flags observed over the life of the flow. | 270 |

Figure 2

(PRIOR ART)

METHOD FOR SUMMARIZING FLOW INFORMATION FROM NETWORK DEVICES

FIELD OF THE INVENTION

The present invention relates to aggregating network flow information within a relational database by maximizing concurrency between insertion and analysis of database records. In particular, the aggregating of network flow information within a relational data store minimizes the latency of insert and query operation for large sets of data.

BACKGROUND OF THE INVENTION

Network usage data is useful for many important business functions, such as subscriber billing, marketing & customer care, product development, network operations management, network and systems capacity planning, and security. Network usage data does not include the actual information exchanged in a communications session between parties, but rather includes numerous usage detail records, known as "flow records" containing one or more types of metadata (i.e., "data about data"). Known network flow records protocols include Netflow®, sFlow®, jFlow®, cFlow® and Netstream®. As used herein, a flow record is defined as a small unit of measure of unidirectional network usage by a stream of IP packets that share common source and destination parameters during a time interval.

The types of metadata included within each flow record vary based on the type of service and network involved and, in some cases, based on the particular network device providing the flow records. In general, a flow record provides detailed usage information about a particular event or communications connection between parties, such as the connection start time and stop time, source (or originator) of the data being transported, the destination or receiver of the data, and the amount of data transferred. A flow record summarizes usage information for very short periods of time (from milliseconds to seconds, occasionally minutes). Depending on the type of service and network involved, a flow record may also include information about the transfer protocol, the type of data transferred, the type of service (ToS) provided, etc. In telephony networks, the flow records that make up the usage information are referred to as call detail records (CDRs).

In network monitoring, the network flow records are collected, stored and analyzed to produce meaningful result. Network usage analysis systems process these flow records and generate reports or summarized data files that support various business functions. Network usage analysis systems provide information about how a network services are being used and by whom. Network usage analysis systems can also be used to identify (or predict) customer satisfaction-related issues, such as those caused by network congestion and network security abuse. In one example, network utilization and performance, as a function of subscriber usage behaviour, may be monitored to track a user's experience, to forecast future network capacity, or to identify usage behavior indicative of network abuse, fraud and theft.

As networks become larger and as more tasks are performed within the networks, such as transferring conventional telephone communications to Voice over IP (VOIP), the network flow on the data transactions can be voluminous and will quickly exceed storage and processing capacities.

In response to this problem of the large volume of the collected network flow information, one known solution uses sampling techniques to decrease data flow volume. Different sampling methods can be used by the network device to collect the information. Sampling can be done at the packet level or the flow level, and can be random or deterministic. Depending on which type of sampling method used, the effect will apply to CPU/memory utilization on the network device and/or bandwidth usage to export flow information to the collector. While the sampling may reduce the overall volume of collected network flow information, the total amount of data is often still voluminous. Furthermore, sampling does not address other problems within current network monitoring methodologies. For example, sampling techniques may not provide a proper picture of the network traffic because some data is being ignored in the process.

For example, another problem with current network monitoring methodologies is a contention in storage resources when trying to access the stored network flow information as additional network flow information is regularly being added. Typically, as network flow data is being accessed for analysis, new network flow information cannot be stored. Likewise, as new network flow information is in the process of being stored, the existing network flow data typically cannot be accessed.

SUMMARY OF THE INVENTION

In response to these and other needs, embodiments of the present invention relate to a method for aggregating network flow information within a relational database by minimizing the number of database objects required for the aggregation. In particular, flow records are generally stored according to the associated network device. Subsequently, the raw flow records are aggregated into separated tables associated with the certain time intervals and separately organized. In this way, contention is decreased as analysis can occur on the aggregated flow records, while new flow records are stored.

In one embodiment, a system for aggregating network flow information includes a storage system. The storage system includes a raw data table containing raw flow record data for a current time period for a first network device and a second raw data table containing raw flow record data for a current time period for a second network device. The system further includes a aggregated data table containing aggregated flow record data for the first and the second network devices. Optionally, the storage system further includes a aggregated data table containing aggregated flow record data for the first and second network devices in a first prior time period, and a second aggregated data table containing second aggregated flow record data for a second prior time period. The first period and the second period do not overlap. Optionally, the first period and the second period are of equal duration. Otherwise, the first period has a first duration and the second period has a second, relatively greater duration. For example, the flow records may be aggregated every hour, day, and week. The system of may further include a flow generating device and a data analysis device, whereby the flow generating device is configured to concurrently provide new flow records to the raw data table as the data analysis device accesses the first aggregated data table. The system may also include an archival storage system that is configured to store the raw flow record data for the first network device.

In another embodiment, a method for aggregating network data flows includes, during a first period of time, storing first flow records in a first table and second flow records in a second table, and after the first period of time and during a second period of time, creating an aggregated table to aggregate both the first and the second flow data records. The method of may also include the steps of, after the second period of time and during a third period of time, creating a third table, storing flow records in the third table, and aggregating flow records from the second period in a second aggregated table. The first period and the second period may be of equal duration, or the first period is relatively longer than the second period. Optionally, the steps of storing new raw flow records and aggregating existing flow records occur concurrently. The method may further include the steps of archiving the first flow records and the second flow records, and compressing the archived first and second flow records.

In another embodiment, a system for aggregating network flow information includes two or more flow generating devices configured to access a storage system to provide flow records, a storage system configured to store the flow records and to store aggregated flow records corresponding to flow records associated with the network components, wherein, each of the first and second flow records has a time stamp within a first predefined range and each of the aggregated flow records has a time stamp outside of the first predefined range. Also, the system includes a data analysis tool configured to access the storage system, wherein the flow generating device and the data analysis device are configured to access the storage system concurrently. Optionally, the aggregated data table may include sub-tables, wherein each of the sub-tables is associated with a separate time period, and each of the sub-tables includes one or more of the aggregated flow records having a time stamp corresponding to the time periods.

BRIEF DESCRIPTION OF THE DRAWINGS

The above and other objects, features and advantages of certain exemplary embodiments of the present invention will be more apparent from the following detailed description taken in conjunction with the accompanying drawings in which.

DETAILED DESCRIPTION OF THE PREFERRED EMBODIMENTS

Figure 1:
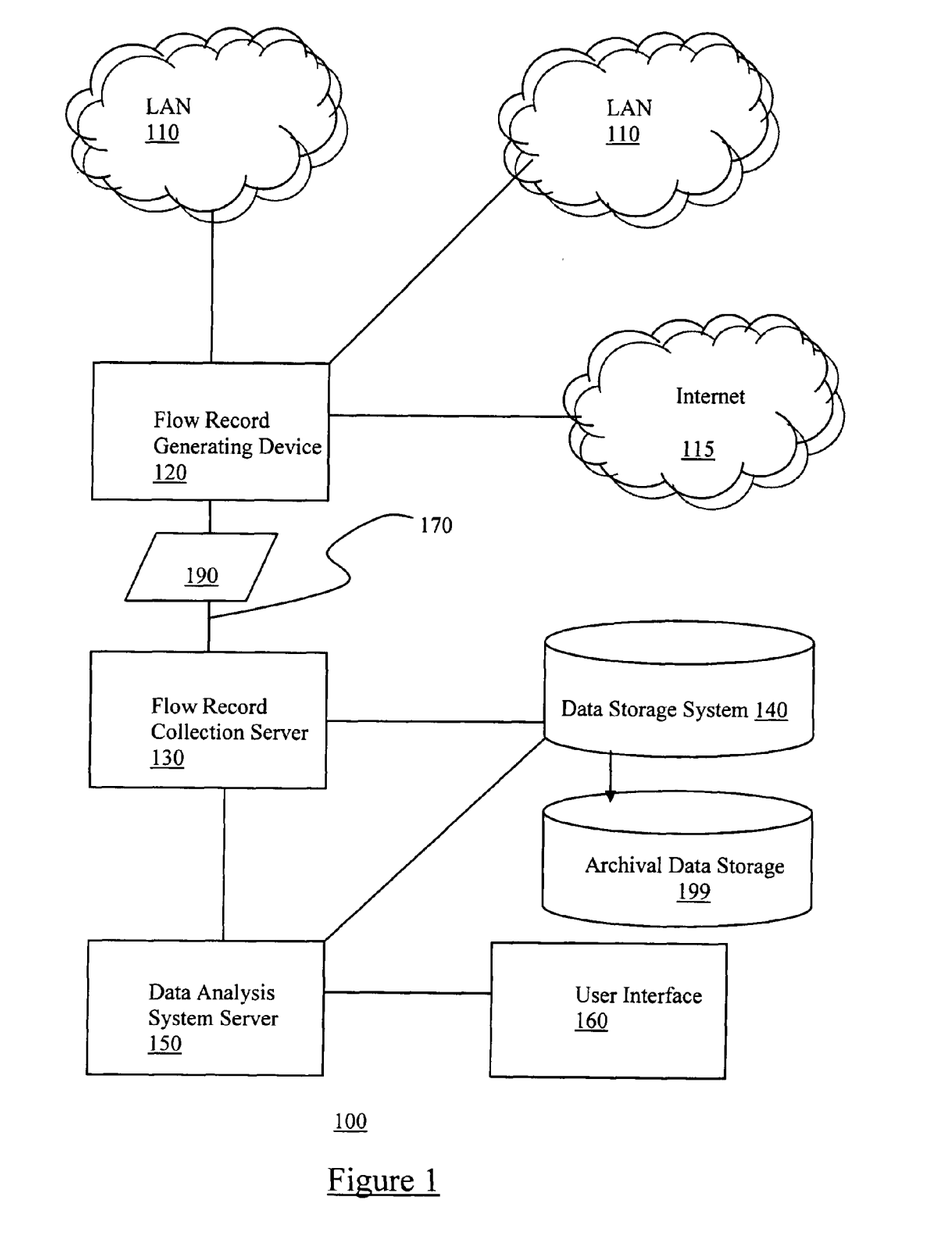
FIG. 1 depicts a flow records analysis system in accordance with embodiments of the present invention.

As shown in FIG. 1, a network usage analysis system 100 includes a data collection system server 130 and a data storage system 140, in one embodiment. The data collection system server 130, also called a listener, is a central server that collects the flow datagrams 190 from all various network agents 120 to storage and analysis. The data collection system server 130 receives flow records 190 from the flow record generating device 120, which is a network device that is part of an IP network 110. In one embodiment, network 110 includes the Internet 115.

In general, flow record generating devices 120 may include substantially any network device capable of handling raw network traffic at "line speeds" and generating flow records from that traffic. Exemplary flow record generating device 120 include routers, switches and gateways, and in some cases, may include application servers, systems, and network probes. In most cases, the small flow record records generated by flow record generating devices 120 are exported as a stream of flow records 190 to the data collection system server 130.

Various network protocol run on network equipment for collecting network and internet protocol traffic information. Typically, various network agents 120, such as routers, have flow feature enabled to generate flow records. The flow records 190 are typically exported from the network agent 120 in User Datagram Protocol (UDP) or Stream Control Transmission Protocol (SCTP) packets and collected using a flow collector. For more information, please refer to Internet Engineering Task Force (IETF) standard for Internet Protocol Flow Information eXport (IPFIX) at http://www.ietf.org/html.charters/ipfix-charter.html.

As described above, flow records 190 are usually sent by the network agents 120 via a UDP or SCTP, and for efficiency reasons, the network agents 120 does not store flow records once they are exported. With a UDP flow, if the flow record 190 is dropped due to network congestion, between the network agent 120 and the data collection server 130, it may be lost forever because there is no way for the network agent 120 to resend the flow record 190. Flow may also be enabled on a per-interface basis to avoid unnecessarily burdening of the router's processor. Thus, the flows records 190 are generally based on the packets input to interfaces where it is enabled to avoid double counting and to save work for the network agent 120. Also, the network agent 120 may export a flow records for dropped packets.

Network flows have been defined in many ways. In one implementation, a flow includes a 5-tuple: a unidirectional sequence of packets to define Source IP address, Destination IP address, Source TCP port, Destination TCP port, and IP protocol. Typically, the network agent 120 will output a flow record when it determines that the flow is finished. The network agent 120 does this by "flow aging," where the network agent 120 resets an aging counter when the network agent 120 sees new traffic for an existing flow. Also, TCP session termination in a TCP flow causes the network agent 120 to expire the flow. The network agent 120 can also be configured to output a flow record at a fixed interval even if the flow is still ongoing. Alternatively, an administrator could define flow properties on the network agent 120.

A flow record 190 can contain a wide variety of information about the traffic in a given flow. An exemplary flow record 200 contains the following values, as defined in FIG. 2. In particular, a typical flow records 200 may include a version number 210 to identify the type of flow being used. A sequence number 220 identifies the flow record.

Figure 2:
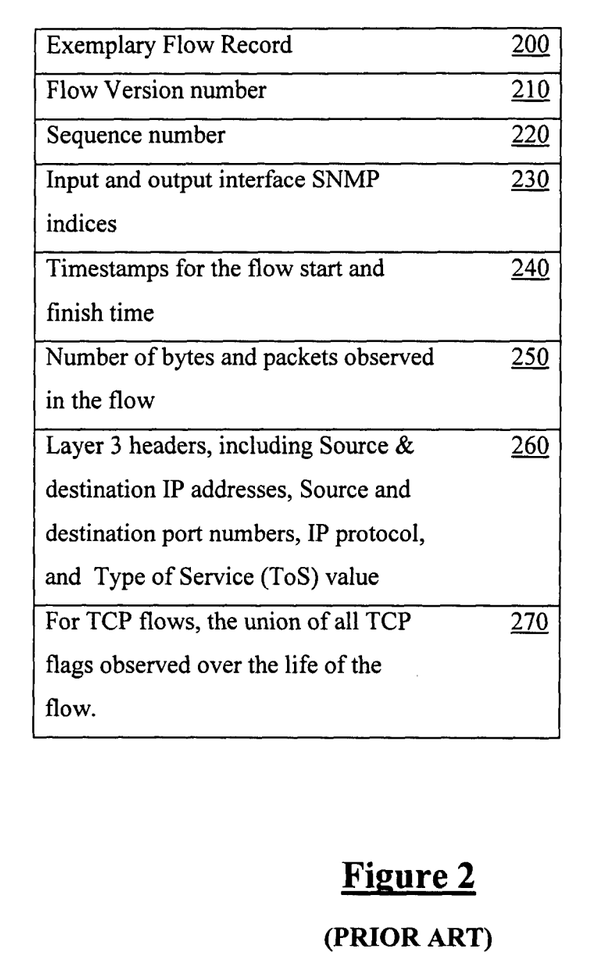
FIG. 2 depicts an exemplary flow record in accordance with embodiments of the present invention.

Continuing with FIG. 2, input and output interface simple network management protocol (SNMP) indices 230 may be used to dynamically identify network devices through SNMP. SNMP is used by network management systems to monitor network-attached devices for conditions that warrant administrative attention, and consists of a set of standards for network management, including an Application Layer protocol, a database schema, and a set of data objects. SNMP exposes management data in the form of variables on the managed systems, which describe the system configuration. These variables can then be queried (and sometimes set) by managing applications. Modular devices may renumber their SNMP indexes whenever slotted hardware is added or removed. Index values are typically assigned at boot time and remain fixed until the next reboot.

Continuing with FIG. 2, each of the flow records 200 further typically include information on the data transmission, including a time stamps of start and finish times 240. Other information on the data transmission includes information on the number of bytes and/or packets in a flow 250. The conditionals of the data transfer may also be included in the flow record 200, such as header data 260 describing the source and destination addresses, the source and destination addresses port numbers, transmission protocol, and the type of service (ToS). For Transmission Control Protocol (TCP), the flow record 200 may further indicate the union of all TCP flags during the flow. As well known from TCP, a data transmission involves a series of communications confirm, for example, by pairs of acknowledgements flags (ACKs). An imbalance of TCP flags suggests a message failure, whereby a message was sent and never received.

As suggested above, acquiring and storing the flow data can be computationally expensive for the router and burden the router's processor to the point where it runs out of capacity. To reduce problems caused by processor exhaustion in the network agent 120, the above described sampling techniques, may be used in another embodiment of the present invention. When sampled flows are used, the flow records 190 can be adjusted for the effect of sampling, and various values such as traffic volumes are estimations rather than an actual measured flow volume.

The lack of reliability in the UDP transport mechanism does not significantly affect the accuracy of the measurements obtained from a sampled flow. For example, if flow samples are lost, then new values will be sent when the next polling interval has passed. In this way, the loss of packet flow samples is a slight reduction in the effective sampling rate. When sampling is used, the UDP payload contains the sampled flow datagram. Thus, instead of including an entire flow record 190 each datagram instead provides information such as the flow version, its originating agent's IP address, a sequence number, how many samples it contains and the flow samples.

Continuing with FIG. 1, the data collection system server 130 receives the streaming flow records 190 from flow record generating device 120 via a communication link 170. In one embodiment, the flow record generating device 120 may be included within network 110. In another embodiment, the flow record generating device 120 may be implemented at a location physically apart from, though functionally coupled to, network 110. Though shown in FIG. 1 as separate from the data collection system server 130, flow record generating device 120 may be a part of data analysis system server 130, in another embodiment.

A data analysis system server 150 accesses and uses the flow records 190 to perform predetermined network usage statistical analysis. In general, the data analysis system server 150 implements various statistical model that are defined to solve one or more network usage related problems, such as network congestion, network security abuse, fraud and theft, among others. The data analysis system server 150 uses the flow records 190 and the statistical models to generate a statistical result, which also may be subsequently stored within a data storage system 140. Exemplary embodiments for storing the statistical result will be described in more detail below. By analyzing flow data, the data analysis system server 150 can build a picture of traffic flow and traffic volume in a network.

In one aspect, the data analysis system server 150 may be responsive to a user interface 160 for interactive analysis of the flow records 190. User interface 160 may comprise substantially any input/output device known in the art, such as a keyboard, a mouse, a touch pad, a display screen, etc. In one example, a graphical display of the statistical results may be output to a display screen at user interface 160.

In one embodiment, data analysis system server 150 comprises a computer software program, which is executable on one or more computers or servers for analyzing the network usage data in accordance with various embodiments of the invention. Although the data storage system 140 is shown as external to the data collection system server 130 and/or the data analysis system server 150, the data storage system 140 could be alternatively arranged within either of the servers 130 and 150. Data storage system 140 may comprise substantially any volatile memory (e.g., RAM) and/or non-volatile memory (e.g., a hard disk drive or other persistent storage device) known in the art.

As previously suggested, while the each of the flow records 190 is typically compact, even small sized networks 100 may have a large number of data transactions, thereby creating a large number of the flow records 190 since there are constant data exchanges within the network 100. As a consequence, network usage analysis system 100 may produce and store numerous flow records 190 in the data storage system 140 during a given time period.

Continuing with FIG. 1, in response to these and other needs, embodiments of the present invention aggregate the flow records 190 stored in the data storage system 140 depending on the characteristics of the flow records 190. As described in greater detail below, the aggregation in the data storage system 140 addresses many problems related to the large volume of the flow records 190 and the need to access the existing records 190 while writing new flow records 190. In the in one embodiment of the present invention, the flow records 190 may also be stored redundantly and entirely in an archival data storage system 199 in which no data aggregation occurs. For example, the flow records 190 may be acquired as needed, even after aggregation in the data storage system 140. The flow records 190 may be forwarded to the archival data storage system 199 concurrently with the delivery of the flow records 190 to the data storage system 140. Alternatively, the data storage system 140 may write the flow records 190 to the archival data storage system 199 as part of the aggregation process. Because the archival data storage system 199 is rarely accessed, the flow records 190 stored within it may be significantly compressed using known techniques while substantially preserving all of the data contained within the flow records 190.

Figure 3:
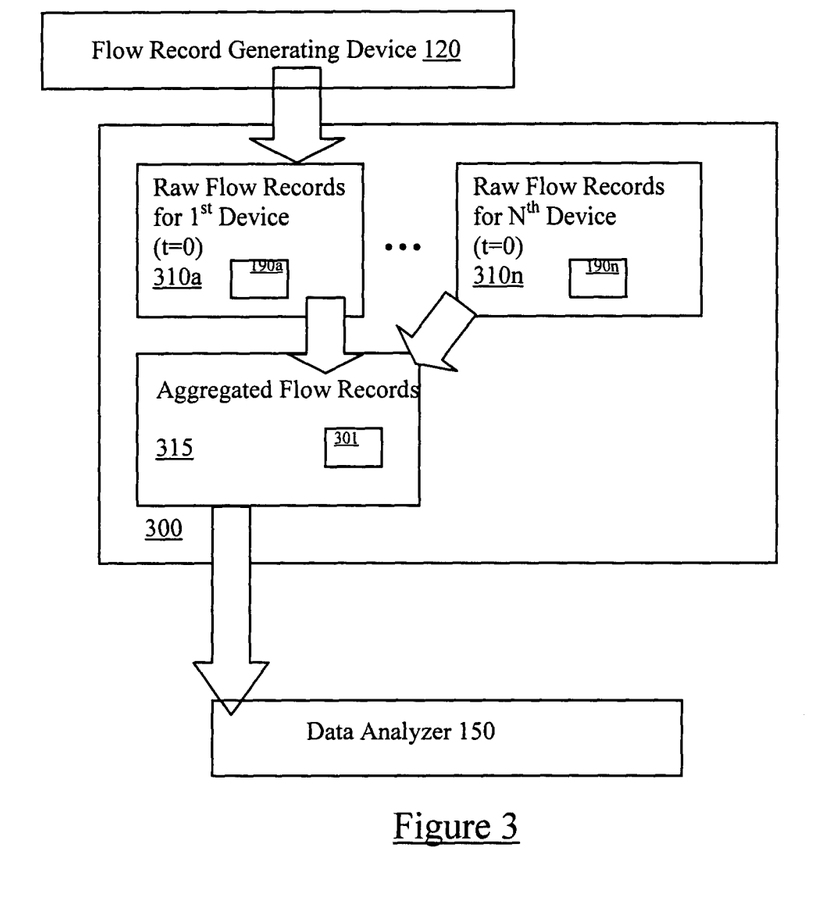
FIGS. 3, 4A-4B, and 5 depict databases for aggregating the flow records in the flow records analysis system of FIG. 1 in accordance with embodiments of the present invention

Referring now to FIG. 3, the data storage system 140 for aggregating the numerous stored flow records 190 in accordance with an embodiment of the present invention is now presented. In particular, the data storage system 140 is typically a standard query language (SQL) database 300 on a storage area network (SAN). The database 300 includes multiple tables 310a-310n and 315 that divide the database 300.

In the depicted embodiment, tables 310a-310n store raw flow records 190a-190n, as described above in FIG. 2. In particular, the raw flow records 190a-190n are flow records that associated, respectively, with different network devices a through n. The flow records 190a-190n typically identify the device associated with the flow records. For example, in FIG. 2 above, the exemplary flow record 200 allows identification of a node by either a SNMP index, IP address, or port number. Likewise, tables 310a-310n are each associated with a different network device a through n. As flow records 190a-190n are received in the database 300, the flow records 190a-190n are stored, respectively, in the tables 310sa-310n. After some trigger event, such as when one of the tables 310a-310n becomes full, the stored flow records 190a-190n in tables 310a-310n are identified, aggregated, and moved to table 315.

For example, in one embodiment, data flows records 190a-190n from the current time period are stored in raw tables 310a-310n. When the flow records 190a-190n in the current tables 310a-310n age beyond a predefined threshold, which may be defined according to the storage and access needs of the system 100, the flow records 190a-190n are aggregated as desired as the aggregated flow data 301, and the current raw tables 310a-310n are reset or a new current tables 310a-310n are created using the Data Definition Language (DDL) functions to store new flow records 190. Likewise, the aggregated tables 315 contains, aggregated flow data 301 for the devices a-n.

In this way, the aggregation generally occurs along one or more of the above-described data categories within the flow record. For example, the aggregated may describe all data of a type or protocol transmitted to or from a particular router a during a time period.

Continuing with FIG. 3, it can be seen that the Flow Record Generating Device 120 may forward new flow records 190 in the current tables 310a-310n. At the same time, the Data Analyzer 150 may access the aggregated data 301 in the aggregated table 315. In this way, data contention is minimized. Furthermore, because the aggregated data 301 are significantly smaller than the flow records 190a-190n, significant storage capacity is freed. Also, the analysis is greatly eased since the aggregated data 301 are pre-processed and, therefore, significantly smaller.

As described above, the embodiment depicted in FIG. 3 generally describes the periodic and cyclical aggregation and storage of the current flow records for each of n network devices. It should be appreciated that the duration of the time periods may be defined as needed to accomplish the goals of the data analysis system 100. For example, data may be aggregated every few minutes, hourly, or daily.

The aggregated data 301 in the aggregated table 315 may be formed as needed, according to known aggregation techniques. One record in the aggregated data 301 for a time period may include an aggregated flow describing all communications of a particular type during that time period. In this way, a separate record may by used for communications between the node of interest and different nodes, or different types of communications (different protocols, QoS, etc.) between the node of interest and different nodes.

Figure 4A:
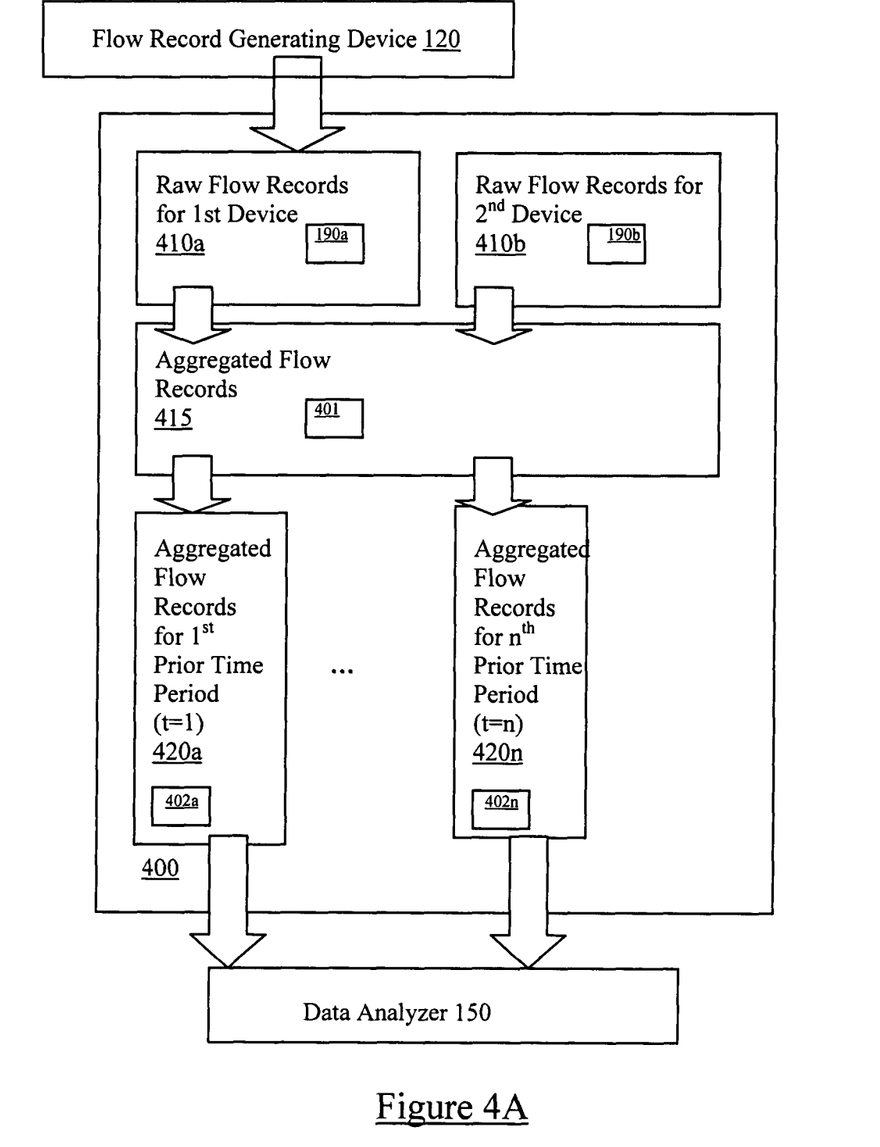

Referring now to FIG. 4A, in another embodiment of the present invention, the data storage system 140 is a database 400. The database 400 includes a raw tables 410a and 410b and aggregated tables 415 and 420a-420n that divide the database 400. In the depicted embodiment of FIG. 4A, the tables 410a and 410b are used in the current time period to store each of the new flow records 190a and 190b. While a network 400 having two network devices a and b is presented, it should be appreciated that any number of network devices may be used and accommodated in accordance within the principles of the present disclosure.

Similar to FIG. 3, in the depicted embodiment, of FIG. 4A, tables 410a and 410b store raw flow records 190a and 190b, as described above in FIG. 2. The raw flow records 190a and 190b are each associated with different network devices a and b Likewise, the raw tables 410a and 410b are each associated with the different network devices a and b and store the raw flow data at the device level. As flow records 190a and 190b are received in the database 400, the flow records 190a and 190b are stored in the raw data tables 410a and 410b. After some trigger event, such as when one of the tables 410a and 410b becomes full or when a time threshold is achieved, the stored flow records 190a and 190b in table 410a and 410b associated with particular devices a or b (or device categories a or b) moved to table 415 for aggregation.

For example, in one embodiment, data flows records 190a and 190b from the current time period are stored in current raw tables 410a and 410b. When the flow records 190a and 410b in either of the current table 410a or 410b age beyond a predefined threshold, which may be defined according to the storage and access needs of the system 100, the flow records 190a and 190b are aggregated as desired as the aggregated flow data 401, and the current tables 410a and 410b are reset or a new current tables 410a and 410b are created using the DDL functions to store new flow records 190a and 190b.

Continuing with FIG. 4A, after the data is aggregated in table 415, the data is re-aggregated according to the time period associated with the flow records, where tables 420a-420n are flow records associated in time periods a through n and are formed from table 415. Thus, in the depicted embodiment, each of the tables 410 and 420a-420n, is associated with a different, mutually time period, including the current time period and n prior time periods. As described above, in the current time period, each of the new flow records 190a-190b is stored in current tables 410a-410b. When the flow records 190a-190b in the current table 410a-410b age beyond a predefined threshold, which may be defined according to the storage and access needs of the system 100, the raw flow records 190a-190b are aggregated as desired as the aggregated flow data 401 in aggregated table 415 that includes aggregated data records for a current time period. Each of the other aggregated tables 420a-420n contains, respectively, aggregated flow data 402a-402n for previous time periods a through. In this way, the aggregation generally occurs along one or more of the above-described data categories within the flow record.

Continuing with FIG. 4A, it can be seen that the Flow Record Generating Device 120 may forward new flow records 190a-190b in the current tables 410a-410b. At the same time, the Data Analyzer 150 may access the aggregated data 40 and 402a-402n in each of the aggregated tables 415 and 420a-420n. In this way, data contention is minimized because aggregated data may be aggregated as new flow data is added to one of the current tables. Furthermore, because the aggregated data 401 and 402a-402n is significantly smaller than storing the raw flow records 190a-190b without any changes, significant storage capacity is freed. Also, the analysis is greatly eased since the aggregated data 401 and 402a-402n is partially processed.

As described above, each of the tables 420a-420n is associated with a time period a-n. The time period are mutually exclusive and may be unique and fixed, or as described below, the time periods may vary as needed. The time periods of the tables 420a-420n may be used to assign the flow records 190a-190b. In particular, as noted above in Table 1, each of the flow records typically has an associated time stamp. The time stamp for a flow record is compared to for the time periods of the aggregated tables 415 and 420a-420n to identify an appropriate table.

In this way, the aggregation generally occurs along one or more of the above-described data categories within the flow record. For example, the aggregated may describe all data of a type or protocol transmitted to or from a particular router a during a time period.

As described above, the embodiment depicted in FIG. 4A generally describes the periodic and cyclical aggregation and storage of the current flow records for each of two network devices in n time periods. It should be appreciated that the duration of the time periods may be defined as needed to accomplish the goals of the data analysis system 100. For example, data may be aggregated every few minutes, hourly, or daily, as described below in FIG. 5.

The aggregated data 401 and 402a-402n in the aggregated tables 415 and 420a-420n may be formed as needed, according to known aggregation techniques. One record in the aggregated data 401 for a time period may include an aggregated flow describing all communications of a particular type during that time period.

As described above, when the flow records 190 in the current tables 410a-410b age beyond a predefined threshold or beyond a predefined range of time, which may be defined according to the storage and access needs of the system 100, the new flow records 190a-190b are aggregated as desired with other existing aggregated flow records 190 to form an aggregated flow data 401a-401. As before, the aggregation generally occurs along one or more of the above-described data categories within the flow record. For example, the aggregated may describe all data of a type or protocol transmitted to or from a particular router during the prior time periods. The current table 410a-410b may store records from the latest time period (such as the last fifteen-minute), whereas the aggregated tables 415 and 420a-420n may store aggregated records from of a longer period, such as the rest of the day. The aggregated prior tables 415 and 420a-420n may then be periodically cleared, such as once a day, perhaps after the aggregated data is accessed by the analysis server 150.

It should be further appreciated that the data may be organized and aggregated in the record storage 140 in different ways as needed. For example, referring to another embodiment of the present invention at FIG. 4B. A database 400' includes multiple tables 410a-410b and 420a-420n that divide the database 400'.

Figure 4B:
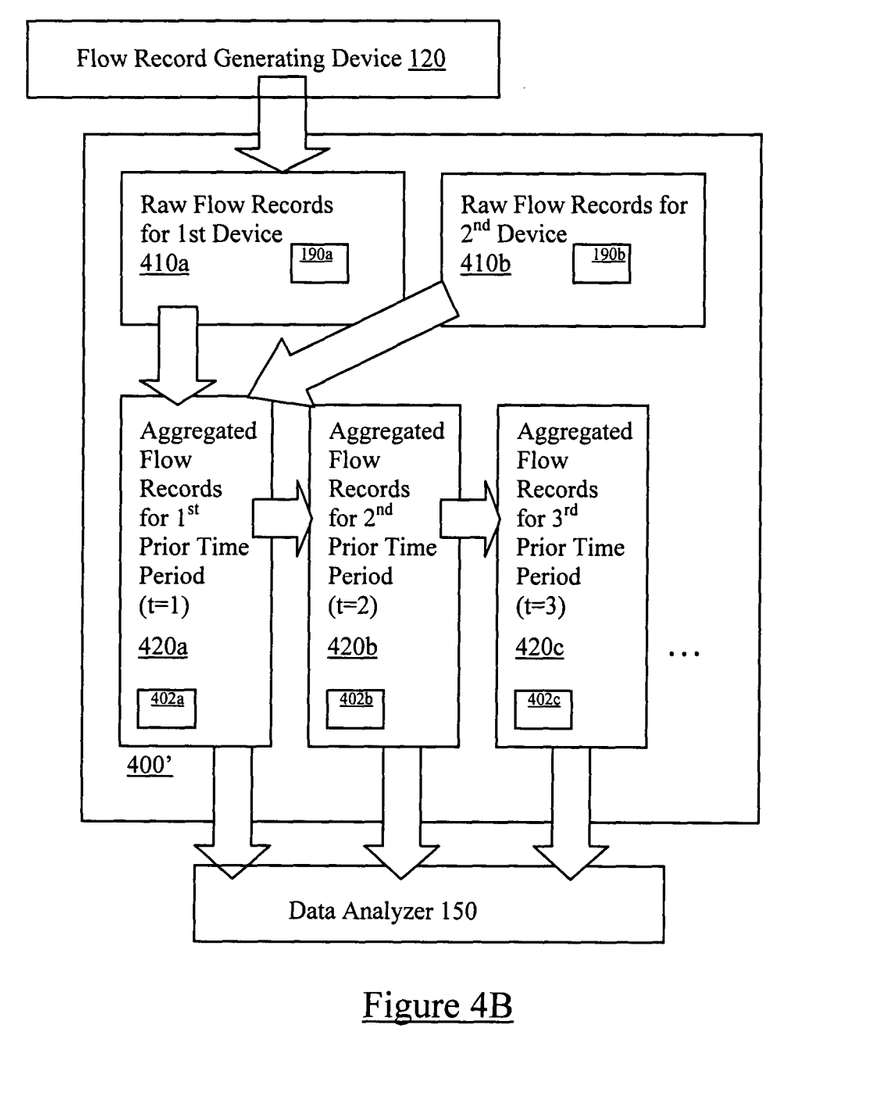

In the depicted embodiment, the tables 410a-410b are used in the current time period and 420a-420n correspond to prior time periods. In the current time period, each of the new flow records 190a-190b is stored in one of the current tables 410a-410b corresponding to devices a and -b associated with the new flow records 190a-190b. When the flow records 190a-190b in the current tables 410a-410b ages beyond a predefined threshold, which may be defined according to the storage and access needs of the system 100, the new flow records 190a-190b are aggregated as desired as the aggregated flow data 402a that aggregates data for a previous time period corresponding to the duration that the current tables 410a or 410b is used, and the current tables 410a and 410b thereby are aggregated to become the first aggregated tables 420a. New current tables 410a and 410b are created using the DDL functions to store the new flow data 190a-190b. Likewise, each of the other aggregated tables 420b-420n contains, respectively, aggregated flow data 402b-402n for previous time periods b-n.

Figure 5:
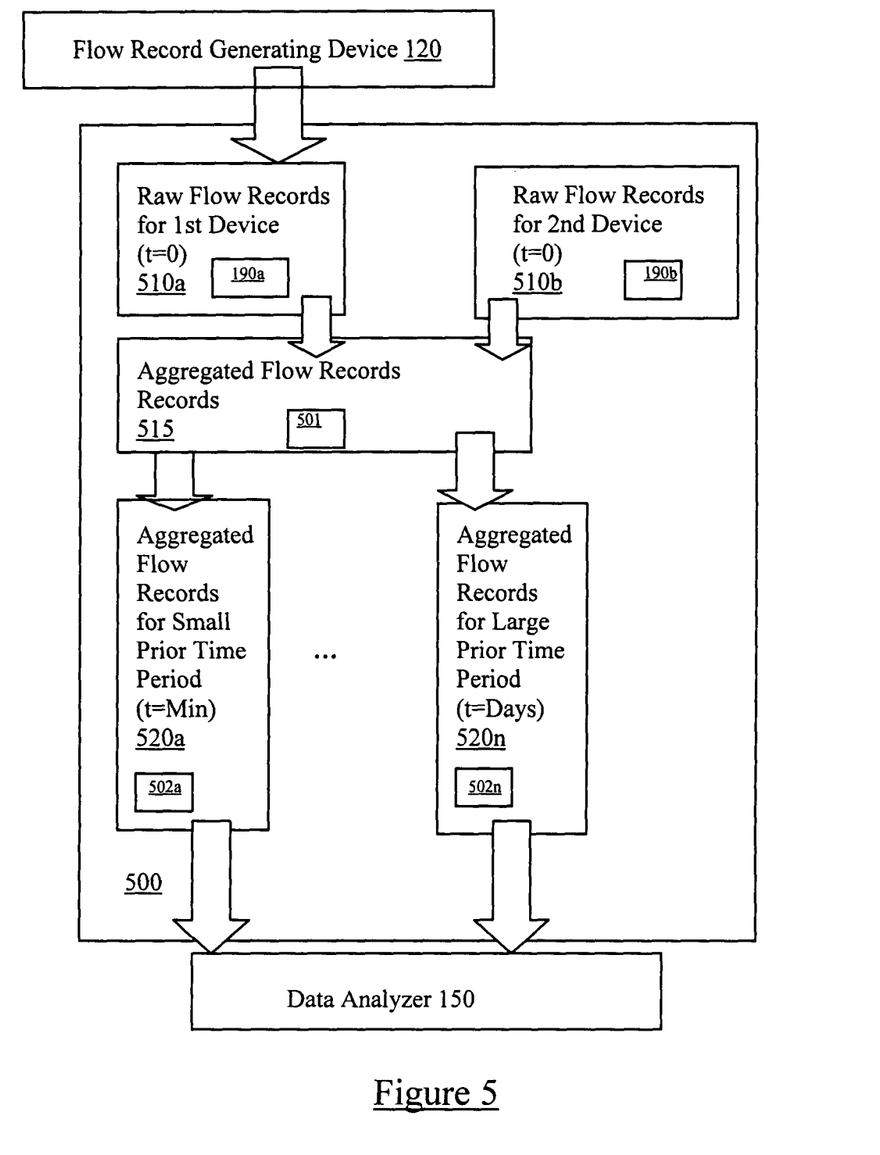

Another embodiment of the present invention is depicted in FIG. 5. Similar to FIG. 4A, multiple tables 510a-510b, 515, and 520a-520n divide the database 500. As before, current database stores new flow records 190a-190b, and after a predefined periods, the flow records 190a-190b may be aggregated according to the devices a and b associated with the records in the aggregated table 515. This data is then re-aggregated in aggregated tables 520a-520n corresponding to past time periods a through n. In FIG. 5, the duration of each of the time period is different from the duration of time period a and increases in duration. For example, FIG. 5 depicts an example where aggregated table 520a correspond to previous period of minutes and table 520n covers a period of days.

Likewise, while it is not depicted in FIG. 5, multiple aggregated tables 520a, may feed data into a single aggregated table of a high aggregation levels. For example, a separate aggregated table may be kept for every hour of a day, and then those hourly aggregated table may be aggregated into a single daily aggregated table. Then, multiple daily aggregated tables may be aggregated into a single weekly aggregated table.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed:

1. A system for aggregating network flow information, the system comprising:
   a storage system, the storage system comprising
   a plurality of raw data tables configured to store raw flow record data for a current time period, wherein each of said raw data tables corresponds to only one of a plurality of separate network devices, and
   a first aggregated data table configured, in response to a trigger event, to aggregate and store first aggregated flow record data for a first time period, wherein the first aggregated flow record data comprises an aggregation of the raw flow record data for one of the plurality of network devices; and
   a flow generating device and a data analysis device, wherein said flow generating device is configured to concurrently provide new flow records to the raw data table as the data analysis device accesses said first aggregated data table.

2. The system of claim 1, wherein the storage system further comprises a second aggregated data table containing second aggregated flow record data for a second time period.

3. The system of claim 2, wherein said first period and said second period do not overlap.

4. The system of claim 2, wherein said first period and said second period are of equal duration.

5. The system of claim 2, wherein said first period has a first duration and said second period has a second, relatively greater duration.

6. The system of claim 1 further comprising an archival storage system that is configured to store the raw flow record data for the first network device.

7. A method for aggregating network data flows, the method comprising:
   creating a first table and a second table;
   during a first period of time, storing first flow records for a first device in a first table and storing second flow records for a second device in a second table;
   after the first period of time and during a second period of time, creating a new first table, a new second table, and a first aggregated table;
   in response to a trigger event, aggregating and storing said first and said second flow records in the first aggregated table; and
   storing new first flow records for the first device in the new first table and storing new second flow records for the second device in the new second table,
   wherein said steps of storing said new first and second flow records in the new first and second tables and aggregating said first and second flow records in said first aggregated table occur concurrently.

8. The method of claim 7 further comprising:
   after the second period of time and during a third period of time, creating a plurality of third tables, wherein each of said third tables is associated with one of several network device;
   storing third flow records in the third tables; and
   aggregating said new first flow records and said new second flow records.

9. The method of claim 8 further comprising:
creating a second aggregated table, wherein said new first flow records and said new second flow records are aggregated in said second aggregated table.

10. The method of claim 8, wherein
new first flow records and said new second flow records are aggregated in said first aggregated table.

11. The method of claim 7, wherein said first period and said second period do not overlap.

12. The method of claim 7, wherein said first period and said second period are of equal duration.

13. The method of claim 7, wherein said first period is relatively longer than said second period.

14. The method of claim 7 further comprising:
archiving said first flow records and said second flow records; and
compressing said archived first and second flow records.

15. A system for aggregating network flow information, the system comprising:
a first and a second flow generating devices configured to access a storage system to provide, respectively, first and a second flow records;
a storage system configured to separately store said first flow records and said second flow records, wherein each of said first and said second flow records has a time stamp within a first predefined range, and configured to only aggregate any of said first and said second flow records having a time stamp outside of said first predefined range; and
a data analysis device configured to access the storage system,
wherein said flow generating device and said data analysis device are configured to access said storage system concurrently.

16. The system of claim 15, wherein the storage system comprises a first data table containing first flow record data, a second data table containing said second flow record, and an aggregated table containing said aggregated first and second flow records.

17. The system of claim 16, wherein said aggregated data table comprising a plurality of sub-tables, wherein each of said sub-tables is associated with a time period, and each of said sub-tables comprises one or more of said aggregated first and second flow records having a time stamp corresponding to said time period.

* * * * *